United States Patent [19]

Onose et al.

[11] Patent Number: 4,855,875

[45] Date of Patent: Aug. 8, 1989

[54] LIGHT SOURCE DEVICE FOR MEDICAL APPARATUS

[75] Inventors: Jun Onose; Kazutoshi Takagi, both of Tokyo; Fukuichi Adachi, Osaka, all of Japan

[73] Assignee: Tokyo Kogaku Kikai Kabushiki Kaisha, Tokyo, Japan

[21] Appl. No.: 192,063

[22] Filed: May 9, 1988

[30] Foreign Application Priority Data

| May 11, 1987 | [JP] | Japan | 62-114033 |
| May 11, 1987 | [JP] | Japan | 62-114034 |
| May 11, 1987 | [JP] | Japan | 62-114035 |
| May 11, 1987 | [JP] | Japan | 62-114036 |

[51] Int. Cl.$^4$ .......................... F21V 8/00; F21V 19/04
[52] U.S. Cl. ........................................ 362/32; 362/33; 362/251; 362/250; 362/254; 362/804
[58] Field of Search ................. 362/32, 33, 227, 238, 362/247, 251, 254, 285, 287, 372, 394, 804, 20, 250; 128/23; 315/88, 93

[56] References Cited

U.S. PATENT DOCUMENTS

| 3,959,612 | 5/1976 | Feinbloom | 362/33 |
| 4,110,820 | 8/1978 | Konoshima | 362/32 |
| 4,402,038 | 8/1983 | Hartung et al. | 362/20 |
| 4,410,929 | 10/1983 | Feinbloom et al. | 362/372 |
| 4,608,622 | 8/1986 | Gonser | 362/32 |
| 4,757,426 | 7/1988 | Scheller et al. | 362/804 |

Primary Examiner—Ira S. Lazarus
Assistant Examiner—D. M. Cox
Attorney, Agent, or Firm—Finnegan, Henderson, Farabow, Garrett & Dunner

[57] ABSTRACT

A light source device for use in a medical apparatus has a turnable or linearly movable member or flange provided in a housing, and an actuator removably attached to the movable flange and carrying two light sources thereon. The actuator has two connector plugs provided thereon which are connected to the two light sources respectively, while the movable member is provided with two corresponding connector sockets. The two connector plugs and the corresponding two connector sockets are coupled and separated together when the actuator and the movable member are coupled and separated together. The device further comprises light conductor means for guiding light from one of the light sources to an object to be illuminated, and switch means connected between a power source and each connector socket. The device is arranged such that one of the two light sources is positioned opposite to the inlet of the light conductor means by moving the movable member coupled with the actuator. The switch means connected to the light source positioned opposite to the light conductor inlet is then closed and power is supplied from the power source to such light source. Thus, according to the invention, light sources can be easily and rapidly set to the device.

8 Claims, 7 Drawing Sheets

LIGHT SOURCE DEVICE FOR MEDICAL APPARATUS

BACKGROUND OF THE INVENTION

1. Field of the Invention

The present invention relates to a light source device for use in a medical apparatus such as an operation microscope, ophthalmoscope, or endoscope.

2. Description of Prior Art

The above-noted medical apparatus use a high luminance light source such as, for example, a halogen lamp for illuminating a part to be operated on, eye fundus under test, or internal part to be observed. Light from the light source is guided to the part or object to be illuminated simply through some transmission means such as, for example, an optical fiber, or further via an optical device for observation.

Halogen lamps used as the light source for such purposes have a relatively short lifetime and are likely to burn out during operation or observation. As a solution for such problem, a prior art is disclosed in U.S. Pat. No. 3,959,612. The device disclosed in this publication has an annular flange rotatably mounted in a lamp housing, and a plurality of halogen lamps mounted on the annular flange. Either one of the plurality of light sources can be selectively placed in an illuminating light path. The device further has a connector which can be electrically connected to the light source selectively placed in the illuminating light path.

If the light source placed in the illuminating light path burns out during operation or observation, the flange can be rotated to place another light source in the illuminating light path, the latter light source being then electrically connected to the connector and thus energized. Thus, interruption of the operation or observation can be avoided.

The prior art disclosed in the above-noted publication, however, requires troublesome manual operations, namely, firstly removing a lamp housing cover, and next setting a light source in each receptacle on the flange, in order to set light sources in the lamp housing.

Meanwhile, it is desirable to break the electrical connection between a power supply and the connector by opening the illumination switch before the light source setting operations. However, the light sources may inadvertently be set or removed when the illuminating switch is closed.

SUMMARY OF THE INVENTION

The prime object of the present invention is therefore to provide a light source device for use in a medical apparatus which allows easy and rapid light-source setting operations.

To achieve this object, the device according to the present invention has a movable member in the form of a rotatable or turnable or linearly movable flange provided in a lamp housing, and two light sources set on an actuator which can be removably coupled to the movable member. The actuator is provided with two connector plugs to which two light sources are to be connected, while the movable member is provided with two connector sockets. When the actuator and the movable member are coupled to or separated from each other, the two connector plugs and the corresponding two connector sockets are connected to or separated from each other simultaneously. Thus, the connector plugs are connected to their corresponding connector sockets by connecting the actuator to the movable member. The device according to the invention further includes light transmission or conductor means for guiding light from one of the light sources to the object to be illuminated, and switch means for making and breaking electrical connection between a power supply and each connector socket. After the actuator and the movable member have been coupled together, either one of the two light sources can be placed opposite to the inlet end of the light transmission means by moving the movable member. Then, a switch means connected to the light source placed opposite to the inlet end of the light transmission means is closed and power is supplied through this switch to the light source.

A second object of the present invention is to provide a light source device for use in a medical apparatus which is provided with a safety stopper mechanism which prevents the actuator from being removed from the movable member or flange when the actuator is in any position other than a predetermined position where the two switches are off, whereby power is not supplied to the two connector sockets when the actuator is not coupled to the movable member.

A third object of the present invention is to provide a light source device for use in a medical apparatus provided with means for preventing the movable flange from moving into a position where the switch means becomes conductive when the actuator is incompletely coupled to the movable flange, whereby irregular illumination or power loss due to such incomplete coupling can be avoided.

A fourth object of the present invention is to provide a light source device for a medical apparatus provided with coupling means for guidance to facilitate coupling and removing operations of the actuator and the movable flange.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 5:
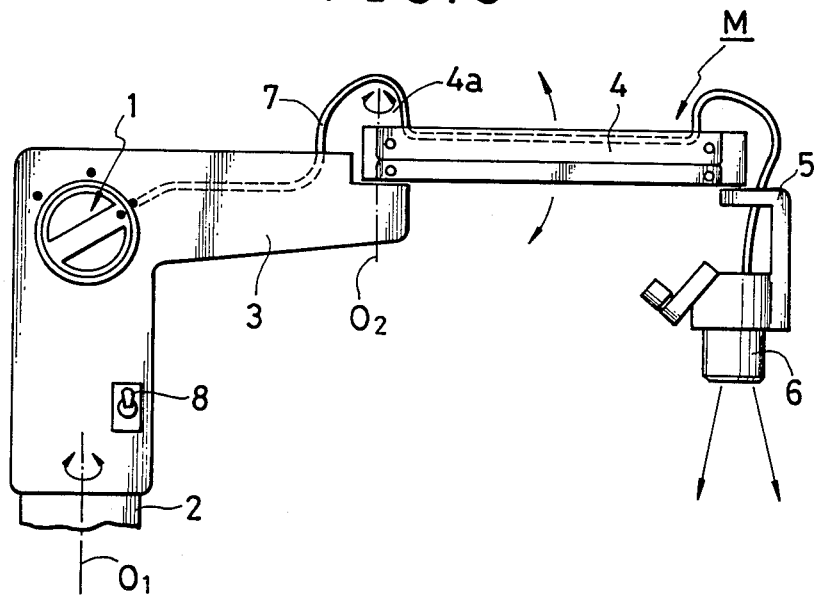
FIG. 5 is an illustration showing an operation microscope incorporating the present invention.

FIG. 5 shows an embodiment of the light source device according to the present invention, generally referenced 1, used in a medical apparatus such as, for example, an operation microscope M.

The operation microscope M has a support post 2, a first arm 3, a second arm 4, an L-shaped arm 5 and a microscope body 6. The support post 2 is mounted on a floor-stand (not shown), and the first arm 3 is mounted to the post 2 in such a manner that it can turn horizontally about an axis $O_1$. The second arm 4 is supported on the nose of the first arm 3 in such a manner that it can turn horizontally about another axis $O_2$ and swingable vertically as shown by arrows 4a. The L-shaped arm 5 is horizontally rotatably mounted to the free end of the second arm 4, and the microscope body 6 is secured to the lower end of the L-shaped arm.

Light transmission or conductor means in the form of an optical fiber 7 is laid in the first and second arms 3, 4. Illuminating light from the light source device 1 is transmitted by the optical fiber 7 to the microscope body 6, and then directed via an illuminating optical system in the body 6 toward an object to be observed. The first arm 3 has an illumination switch 8 provided thereon for energizing and deenergizing the light source device 1.

Figure 1:
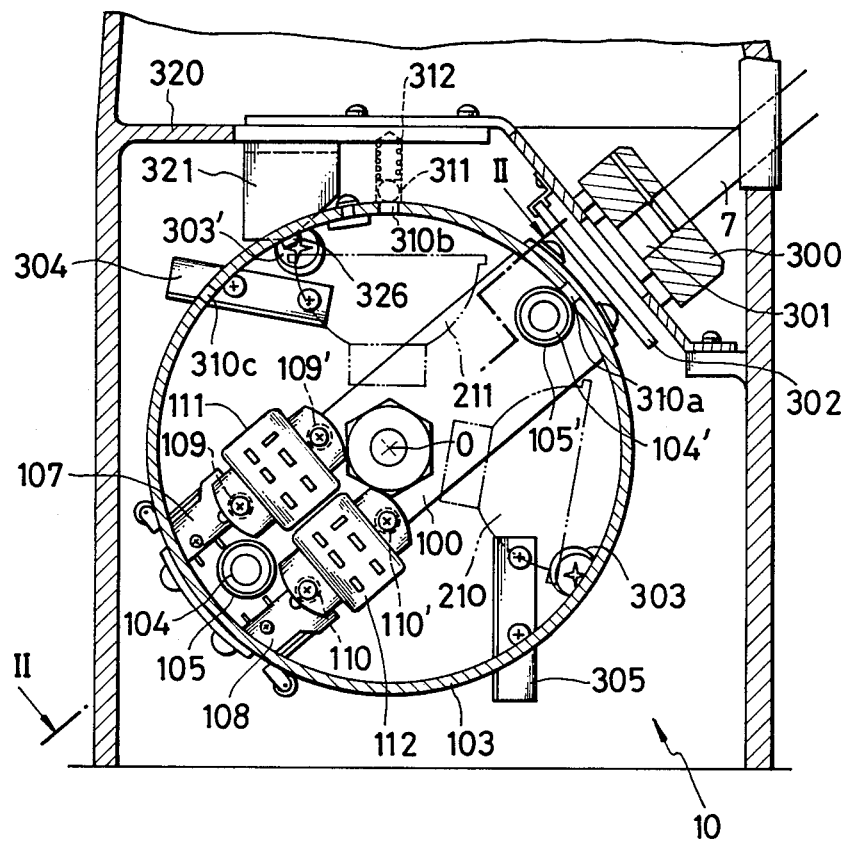
FIG. 1 is a sectional view showing the construction of a rotatable or turnable flange of an embodiment of the light source device according to the present invention.
Figure 2:
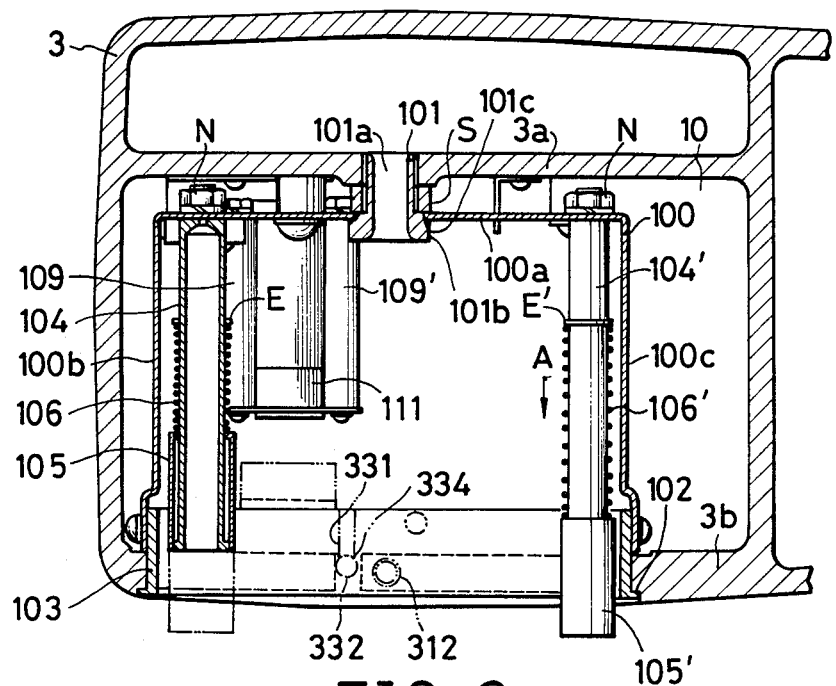
FIG. 2 is a sectional view taken along lines II—II of FIG. 1.

The first arm 3 has a lamp chamber 10 formed therein, as shown in FIGS. 1 and 2. The lamp chamber 10 is formed between a base 3a and an outer side wall 3b. The outer side wall 3b has a circular mounting hole 102 formed therein. The base 3a and the outer side wall 3b extend vertically with respect to the first arm 3.

A hollow bolt or shaft 101 is provided in the lamp chamber 10 and is fixed to the base 3a by screwing. The hollow shaft 101 is inserted into a tubular spacer S which is squeezed between a head 101b of the hollow shaft 101 and the base 3a. An annular groove is formed between an annular shoulder 101c of the head 101b and the spacer S, and a rotary arm 100 of U-shaped cross section is rotatably held in the annular groove. The rotary arm 100 is U-shaped and comprises a bottom plate 100a rotatably supported in the annular groove between the head 101b of the hollow shaft 101 and the spacer S, and side plates 100b, 100c provided on both ends of the base plate 100a. A lamp mount receptacle 103 is fixed to the lower ends of the side plates 100b, 100c. The lamp mount receptacle 103 is rotatably fitted in the circular mounting hole 102. The circular opening in the lamp mount receptacle 103 forms the inlet opening for insertion of a lamp mount to be described.

Two guide pipes 104, 104' are infixed in the bottom plate 100a of the rotary arm 100 at both ends thereof and extend along the side plates 100b, 100c. Externally, these guide pipes 104, 104' have slide pipes 105, 105' axially movably fitted thereon. To prevent the slide pipes 105, 105' from being disengaged from the guide pipes 104, 104', the guide pipes 104, 104' are provided with radially outwardly extending stopper flanges on their free ends, on the one hand, and the slide pipes 105, 105' are correspondingly provided with radially inwardly extending stopper flanges on their ends opposite to the bottom plate 100a on the other hand. Further, spring abutments E, E' are secured to the guide pipes at the middles. A guide spring 106 is interposed between one slide pipe 105 and one spring abutment E, while another guide spring 106' is interposed between the the other slide pipe 105' and the other spring abutment E'. These springs 106, 106' act to urge the slide pipes 105, 105' outwardly of the lamp chamber 10 in the direction of arrow A at all times. Microswitches 107, 108 are attached to the side plate 100b of the rotary arm 100, on opposite sides of the guide pipe 104. Further, a pair of upright socket-mounting legs 109, 109'; 110, 110' is fixed to the bottom plate 100a on each side edge of bottom plate 100b between the center of the bottom plate 100a and the microswitches 107, 108. The socket mounting legs 109, 109' have a connector socket 111 secured thereto, while the other socket mounting legs 110, 110' have another connector socket 112 secured thereto.

Figure 16:
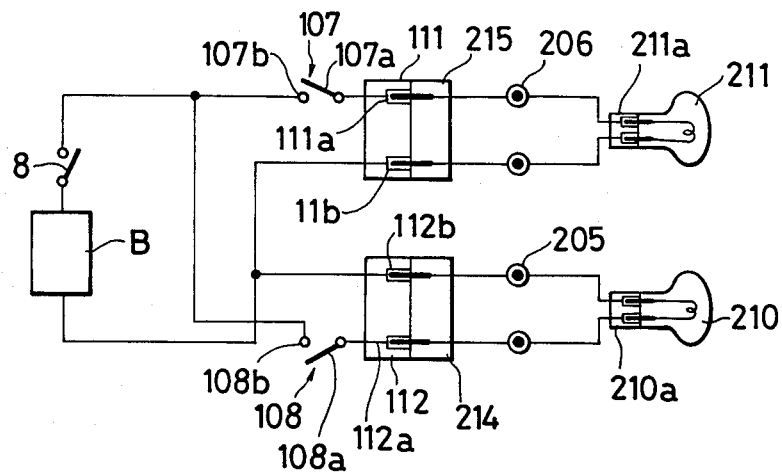
FIG. 16 is a diagram showing the electric circuit of the light source device shown in FIGS. 1–15b.

As seen from FIG. 16, in which electrical connection of the connector sockets 111, 112 is shown, the connector socket 111 has a pair of terminals 111a, 111b, while the other connector socket 112 has another pair of terminals 112a, 112b. The terminals 111a, 112a are electrically connected to movable contacts 107a, 108a of the microswitches 107, 108, respectively, and fixed contacts 107b, 108b of these microswitches are electrically connected through the illumination switch 8 to one pole of a power source B. The opposite pole of this power source B is connected to the terminals 111b, 112b of the connector sockets 111, 112. Meanwhile, the power source B is contained in a support post (not shown), and cables electrically connecting the power source B and the microswitches 107, 108 and the connector sockets 111, 112 are laid to pass through a bore 101a of the hollow shaft 101.

Figure 4:
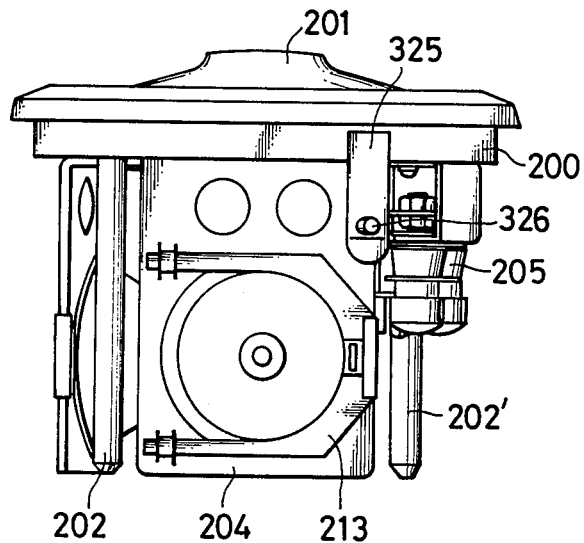
FIG. 4 is a plan view showing the lamp mount of the light source device shown in FIG. 3.

In FIG. 4, the circular disk-shaped lamp mount 200 has a lamp mount knob 201 formed on the front face thereof (the top surface in this figure).

Figure 3:
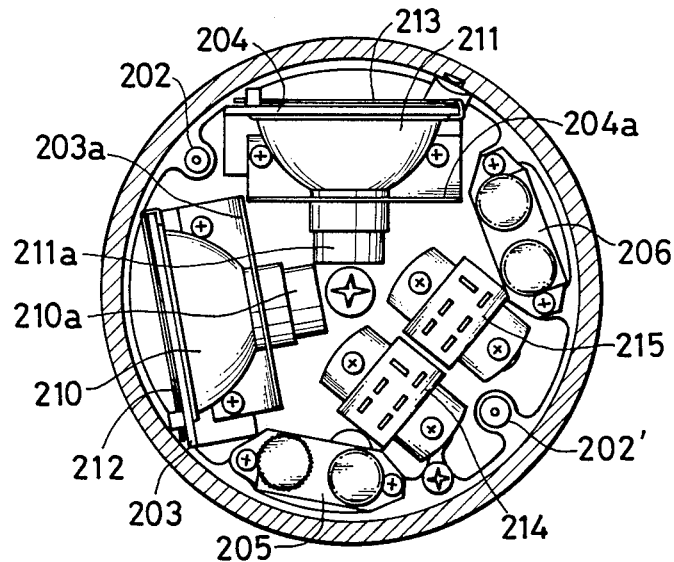
FIG. 3 is a front view showing the construction of a lamp mount of the light source device.

To the rear surface of the lamp mount 200, there are secured: two guide poles 202, 202'; two lamp supports 203, 204; two terminal brackets 205, 206; and two connector plugs 214, 215, as shown in FIGS. 3 and 4.

The two guide poles 202, 202' are disposed on the diametrically opposite peripheral portions of the lamp mount 200 and are perpendicular with respect to the rear surface of the lamp mount 200. The two lamp supports 203, 204 are positioned such that their one sides are adjacent to the guide pole 202. The terminal brackets 205, 206 are disposed along the periphery of the lamp mount 200 and between the guide pole 202' and the lamp supports 203, 204. The two connector plugs 214, 215 are disposed adjacent to the terminal brackets 205, 206 and between the center and the edge of the lamp mount 200 adjacent the guide pole 202'. Further, 203a, 204a denote heat insulating plates of the lamp supports 203, 204.

Each lamp support 203, 204 has a circular opening formed therein, and a known lamp holder 212, 213 attached thereto. A halogen lamp 210, 211 is inserted into the circular opening of each lamp support 203, 204 and is held thereby. The halogen lamps 210, 211 are fixed to the lamp holders 212, 213. A socket 210a inserted into the halogen lamp 210 is electrically connected through the terminal bracket 205 to the connector plug 214, while another socket 211a inserted into the other halogen lamp 211 is electrically connected through the terminal bracket 206 to the connector plug 216.

The lamp mount 200 can be held by the rotary arm 100 by inserting the guide poles 202, 202' provided thereon into the guide pipes 104, 104'. When the lamp mount 200 has been inserted into the lamp mount receptacle 103, the connector plug 215 is connected with the connector socket 111 and the other connector plug 214 is connected with the other connector socket 112.

Within the lamp chamber 10, and outside the region which can be swept by the rotary arm 100, a light guide support 300 is placed and is fixed to the first arm 3. The light guide support 300 has an opening 301 which is open toward the center O of rotation of the rotary arm 100, and the inlet end of the optical fiber 7 is inserted into this opening 301 and is fixed therein. A heat insulating filter 302 is provided adjacent to the side of the opening 301 facing toward the center O of rotation.

To the base 3a of the lamp chamber 10, stopper bosses 303, 303' and limit dogs 304, 305 are fixed. The stopper bosses 303, 303' are provided for limiting the rotation of the rotary arm 100, while the limit dogs 304, 305 are provided for turning on the microswitches 107, 108, respectively, when the rotary arm 100 has rotated and arrived at a predetermined position.

The lamp mount receptacle 103 has three click holes 310a, 310b, 310c for defining the angular position of the rotary arm 100. The outer wall 3b of the third arm 3 has a holding hole (not shown) which opens within the circular mounting hole 102. Within such holding hole, positioning means is provided which cooperates with the three click holes 301a, 301b, 301c for positioning and holding the rotary arm 100 at a selected one of predetermined positions. Such positioning and holding means comprises a ball engageable with the three click holes 301a, 301b, 301c, and a spring 312 urging the ball 311 toward the lamp mount receptacle 103.

Figure 6:
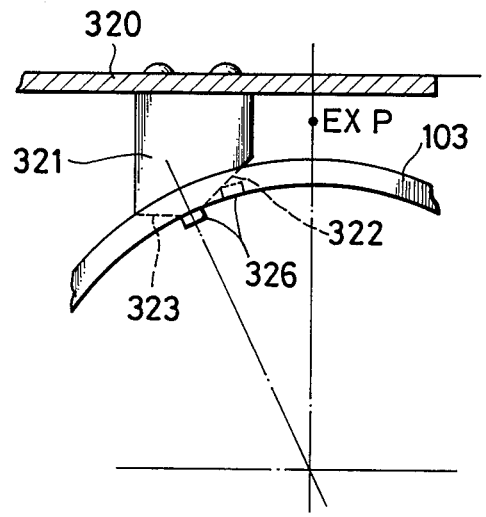
FIG. 6 is an illustration showing the relationship between a lamp mount receptacle and a stopper presser plate.
Figure 7:
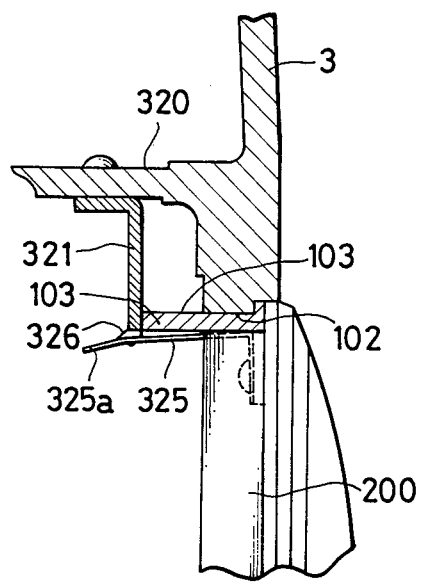
FIG. 7 is a sectional view showing the relationship between the stopper presser plate, a stopper pin and the lamp mount receptacle in an EXP position.
Figure 8:
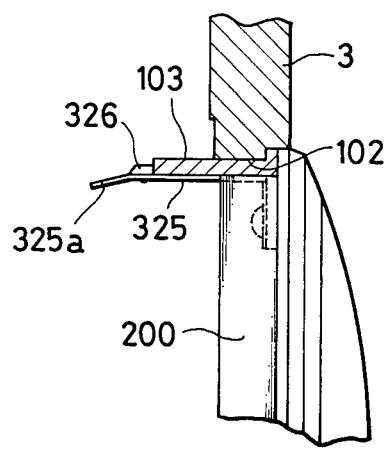
FIG. 8 is a sectional view showing the relationship between the stopper presser plate, the stopper pin and the lamp mount receptacle in a position other than the EXP position.
Figure 9:
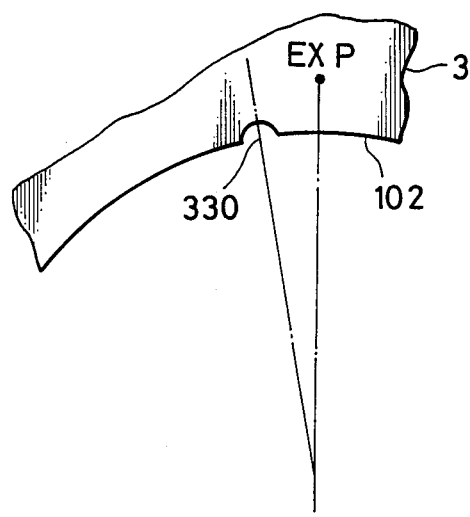
FIG. 9 is a schematic diagram showing the relationship between a stopper groove and the EXP position.
Figure 10:
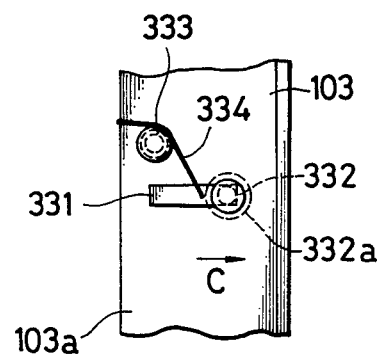
FIG. 10 is a plan view showing the arrangement of a detent pin.

As shown in FIGS. 1 and 6, the first arm 3 has a flange 320 formed thereon and projecting into the lamp chamber 10. A stopper presser plate 321 is attached to the flange 320. The free end of the stopper presser plate 321 is in contact with the inner end surface of the lamp mount receptacle 103, as shown in FIG. 7. The stopper presser plate 321 has an inclined face 322 and an end face 323 connected together at the free end of the plate 321. Further, as shown in FIGS. 4, 7 and 8, the lamp mount 200 has a safety stopper piece 325 of flat spring attached thereto. The safety stopper piece 325 has a bent portion 325a provided at the free end thereof. A stopper projection in the form of a stopper pin 326 is attached to the bent portion 325a. As previously described, the circular mounting hole 102 of the first arm 3 is formed in the outer side wall 3b, and a stopper groove 330 is formed in the wall forming the circular mounting hole 102, as shown in FIG. 9. Meanwhile, a slot 331 is formed in the lamp mount receptacle 103, as shown in FIG. 10. A detent pin 332 is inserted into the slot 331 and is movable in the direction of extension of the slot 331. The detent pin 332 has a head 332b provided at one end, and has a nut 332a screwed to the other end thereof. The detent pin 332 is prevented from falling out of the slot 331 by the head 332b and nut 332a. A pin 333 is infixed in the lamp mount receptacle 103 adjacent to the slot 331, and a spring 334 is wound around the pin 333. The spring 334 has one end thereof engaged with an inner end surface of the lamp mount receptacle 103, and the other end thereof pressing the side of the nut 332a, thereby urging the detent pin 332 in the direction of arrow C (to the right in FIGS. 11 and 12) at all times.

Next, the operation of the so constructed light source device for use in a medical apparatus will be described, with reference to FIGS. 13a–15b.

The lamp mount 200 with halogen lamps 210, 211 set therein, is mechanically coupled to the rotary arm 100 by inserting the guide poles 202, 202' into the guide pipes 104, 104' in the rotary arm 100. The connector plugs are then coupled to the connector sockets 111, 112, respectively, whereby the halogen lamps 211, 212 are electrically connected to the power source B.

Figure 13A:
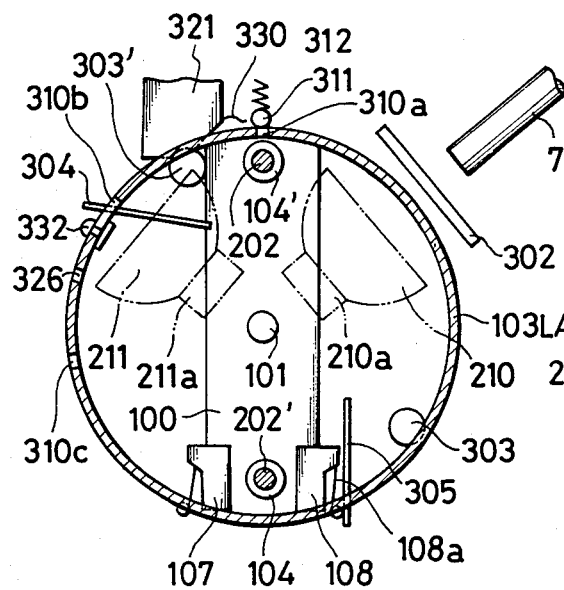
FIG. 13a is a schematic diagram showing the positional relationship between various components when one of two lamps is placed in an illuminating light path.
Figure 13B:
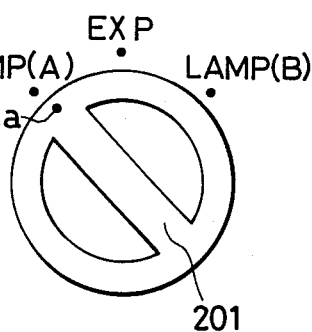
FIGS. 13b, 14b and 15b are diagrams showing the relationship between a lamp mount knob and index indications.

If the operator turns the lamp mount knob 201, the turning force applied to the lamp mount knob 201 is transmitted to the rotary arm 100 through the guide poles 104, 104' and guide pipes 202, 202', whereby the rotary arm 100 will rotate about the hollow shaft 101, as shown in FIG. 13a. Further, if the lamp mount knob 201 is turned until the index 201a on the knob 201 comes next to the indication LAMP(A) and the side surface of the rotary arm 100 strikes against the stopper boss 303', the ball 311 drops into engagement with the click hole 310a in the lamp mount receptacle 103 at the moment the index 201a becomes aligned with the indication LAMP(A).

The halogen lamp 210 is then turned with the lamp mount 200 in the lamp chamber 10 and becomes aligned with the axis of the optical fiber 7, whereby it is positioned in the illuminating light passage. Then, the movable contact 108a of the microswitch 108 secured to the rotary arm 100 strikes against the limit dog 305, whereby such microswitch 108 is closed. If the illumination switch 8 is closed under such conditions, power is supplied from the power source B through the microswitch 108, connectors 112, 214, terminal bracket 205 and socket 210a to the lamp 210, whereby the lamp 210 is turned on.

Figure 14A:
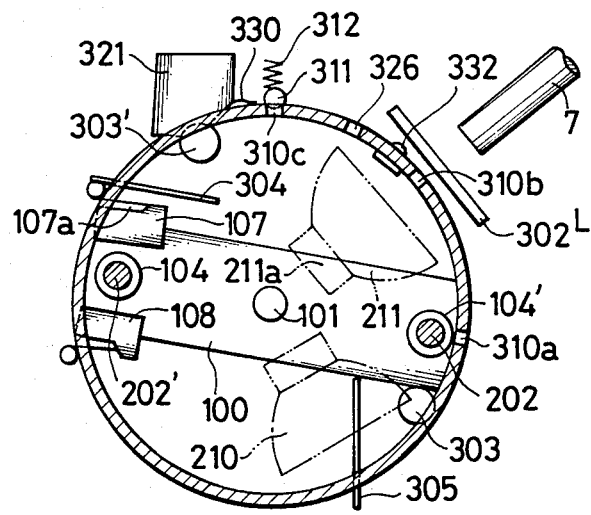
FIG. 14a is a diagram showing positional relationship between various components when the other lamp is placed in the illuminating light path.
Figure 14B:
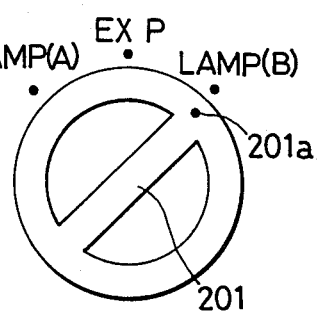

If the lamp 210 has burnt out during a surgical operation, the operator can turn the lamp mount knob 201 clockwise until the index 201a thereon reaches the remote side indication LAMP(B), as shown in FIG. 14b. Thus, the rotary arm 100 will turn about the hollow shaft 101 together with the knob 201. When the rotary arm 100 strikes against the stopper boss 303, the index 201a becomes aligned with the indication LAMP(B) and the ball 311 becomes engaged in the click hole 310c. Simultaneously, the remaining live lamp 211 is positioned opposite to the optical fiber 7 in the illuminating light passage. At the same time, the movable contact 107a of the microswitch 107 strikes against the limit dog 304, whereby this switch 107 is closed. The movable contact 108a of the other microswitch 108 is then free from the other limit dog 305 and thus such microswitch 108 is opened. Thus, power is supplied from the power source B through the closed switch 8, microswitch 107, connectors 111, 215, terminal bracket 206 and socket 211a to the live lamp 211, whereby this lamp is turned on. To continue illumination, alternation of two lamps 210, 211 can thus be achieved simply by a single action of turning the lamp mount 201.

Figure 15A:
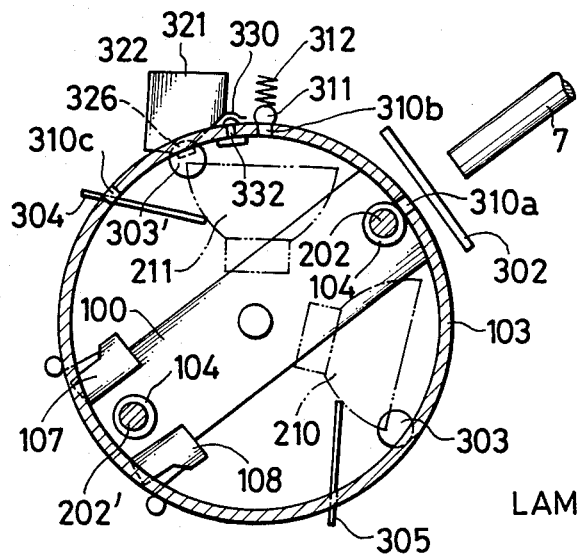
FIG. 15a is a diagram showing the positional relationship between various components in the EXP position.
Figure 15B:
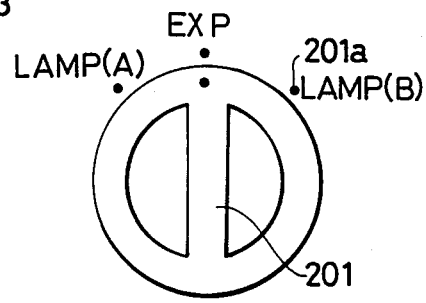

To exchange a burnt out lamp 210 or 211 with a new one, the operator can turn the lamp mount knob 201 until the index 201a is aligned with the middle indication EXP (position for exchange of lamps), as shown in FIG. 15b. This will turn the rotary arm 100 into the middle position shown in FIG. 15a, so that both of the microswitches 107, 108 are turned off and the supply of power from the power source B to these lamps 210, 211 is thus interrupted. Simultaneously, the ball 311 becomes engaged in the middle click hole 310b and the index 201a becomes aligned with the indication EXP.

A stopper pin 326 on the stopper piece 325 abuts against the inner end surface of the lamp mount receptacle 103 and thus prevents the lamp mount from being drawn out when the lamp 210 or 211 is placed in the illuminating light passage.

Meanwhile, when the index 201a is turned from the indication LAMP(B) to EXP as previously described, the stopper pin 326 is pushed down (toward the center axis of the lamp mount receptacle 103 against the elastic force of the safety stopper piece 325 by the action of the inclined surface 322 on the stopper presser plate 321. When the index 201a is moved from the LAMP(B) to the EXP and finally aligned with the EXP, then the stopper pin 326 is released from the inner end surface of the lamp mount receptacle 103 toward the center axis and thus the lamp mount 200 can be removed from the lamp mount receptacle 103 and from the rotary arm 100. In this position, the detent pin 332 held in the slot 331 of the lamp mount receptacle 103 is positioned opposite to the stopper groove 330 formed in the outer side wall 3b.

Thus, under such conditions, the lamp mount 200 can be drawn out of the lamp chamber 10 of the rotary arm 100, i.e. out of the first arm 3. When the lamp mount 200 has been drawn out, the free ends of the slide pipes 105, 105' fitted on the guide pipes 104, 104' will be pushed out of the first arm 3 by the elastic force of the guide springs 106, 106'.

After one or two lamps have been replaced with new one or ones, the guide poles 202, 202' are initially inserted into the outwardly extending ends of the slide pipes 105, 105', and then the lamp mount 200 is inserted into the lamp chamber using the slide pipes 105, 105' as guiding means. The described and shown embodiment has an advantage in that the guide poles 202, 202' can be easily aligned with the guide pipes 104, 104' and thus the lamp mount 200 can be easily inserted into the lamp chamber 10 since a portion of each guide pipe 105, 105' is outside the first arm 3 before the insertion of the lamp mount 200 into the lamp chamber 10.

Figure 12:
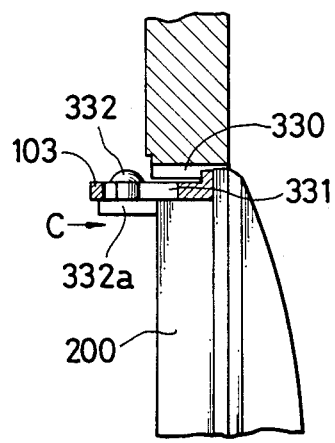
FIG. 12 is a sectional view showing the detent pin when the lamp mount is completely inserted.

When the lamp mount 200 is inserted into the lamp mount receptacle 103, the nut 332a is pushed against the elastic force of the spring 334 and is thus displaced toward the lamp chamber 10. When the lamp mount 200 has been completely coupled with the lamp mount receptacle 103 by insertion, as shown in FIG. 12, the detent pin 332 is released from the stopper groove 330. This allows the lamp mount 200 to be turned to the LAMP(A) and LAMP(B) positions.

Figure 11:
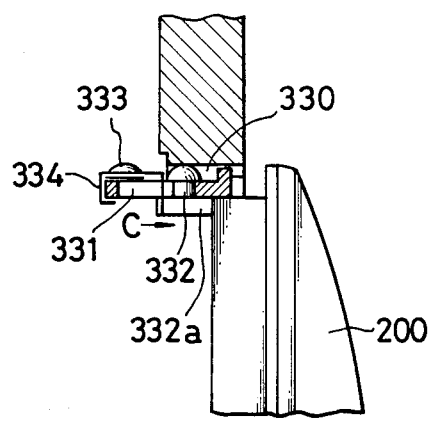
FIG. 11 is a sectional view showing the detent pin when the lamp mount is incompletely inserted.

If the insertion of the lamp mount 200 into the lamp chamber 10 is incomplete, the detent pin 332 is not released from the stopper groove 330, as shown in FIG. 11. Under such conditions, the detent pin 332 engaged in the stopper groove 330 will prevent the lamp mount 200 from being turned to the LAMP(A) or LAMP(B) position. Therefore, when the lamp mount 200 is in an incompletely inserted position in which the filaments of the lamps 210, 211 are positioned outside the plane containing the optical axis of the optical fiber 7, the lamp mount 200 cannot be turned. Incomplete illumination due to misalignment of the lamps 210, 211 with the optical axis of the optical fiber 7 is thus avoided. Also, power loss due to incomplete engagement of the connector sockets 111, 112 and connector plugs 215, 214, as well as leak due to contact with the other components resulting from rotation under such conditions can be avoided.

Meanwhile, if the operator turns the lamp mount knob 201 to the LAMP(A) or LAMP(B) position after the lamp mount 200 has been completely inserted into the lamp chamber 10, the stopper pin 326 of the safety stopper piece 324 is disengaged from the inclined surface 322 of the stopper presser plate 321. Once disengaged from the surface 322, the stopper pin 326 is pressed against the side of the lamp mount receptacle 103 by the elastic force exerted by the safety stopper piece 325, as shown in FIG. 8. This prevents the lamp mount 200 from being drawn out when it is in the LAMP(A) or LAMP(B) position, or in any intermediate position between these extremeties.

The described and shown embodiment comprises a movable flange in the form of the rotary arm 100, on which a generally circular lamp mount receptacle 103 is provided, and an actuator in the form of the generally circular lamp mount 201. It is arranged such that positioning of the light source in the form of the lamp 210 or 211 in the illuminating light passage, actuation of the switch means in the form of the microswitches 107, 108, releasing actuation of the safety stopper mechanism, and actuation of the detent mechanism including the detent pin 332 can all be achieved simply by turning the lamp mount 200. Such rotary mechanism allows the entire device to be made compact.

The present invention, however, is not limited to such rotating arrangement, and another embodiment is also possible which comprises a linear motion mechanism consisting of a movable flange and a lamp mount, in which selected one of a plurality of light sources can be positioned in the illuminating light path or passage by a linear motion of the mechanism. This embodiment can be structured such that opening and closing of the microswitches 107, 108, releasing of the safety stopper mechanism, and actuation of the detent mechanism are all achieved by the linear motion of the movable flange and the lamp mount. A person skilled in the art can easily design such a structure depending on the above description.

Further, the above-described embodiments use two mechanical microswitches 107, 108 as the switch means. Other embodiments are also possible. For example, photoelectric switches such as photointerrupters may be used as the switch means in place of the mechanical microswitches. A switch of the single-pole two-conductive-position one-neutral position type, which can achieve the roles of both microswitches 107, 108, may also be used as the switch means.

As described above, according to the present invention, light sources are mounted on a lamp mount which is removably coupled to a movable flange, which consists of, for example, a rotary arm in a lamp chamber. Further, connectors on the movable flange can be coupled with and separated from corresponding connectors on the lamp mount and the lamps are thus connected to and separated from the power source when the lamp mount is coupled with and separated from the movable flange. Also, a switch is provided which is arranged to interrupt the supply of power from the power source circuit to the lamp when the lamp mount is ready for mounting and dismounting. Such arrangement allows the operator to replace lamps outside the device, without the danger of electric shock.

Further, if a switch is provided which interrupts the supply of power from the power source circuit to the lamp when the lamp mount is in a position where it is ready for mounting and dismounting, then it is possible to further securely avoid the danger of electric shock during lamp-exchanging operation. Also, if a safety stopper mechanism is provided which prevents the lamp mount from being removed from the rotary arm when the lamp mount is in any position other than the ready-for-mounting-and-dismounting position, then such simple mechanism allows the operator to prevent the lamp mount from being removed from the movable flange during lamp-exchanging operation.

Further, a detent means is provided which is adapted to prevent the rotary arm from moving when the lamp mount is incompletely coupled with the rotary arm. This allows the operator to avoid the danger of moving the lamp into the illuminating light path if the lamp is misaligned with the optical axis of the illuminating light path (i.e. optical fiber) due to incomplete coupling of the lamp mount and the rotary arm. Therefore, irregular illumination can be avoided. Further, power loss due to incomplete coupling of connector sockets on the rotary arm and corresponding connector plugs on the lamp mount can be avoided, and leakage is also avoided if the rotary arm incompletely coupled is turned to come into contact with some other component.

Also, if the device is provided with guide poles on the lamp mount, guide pipes on the rotary arm for insertion of the guide poles, and slide pipes on the guide pipes which extend out of the lamp chamber through an insertion opening therethrough for guiding the guide pipes when the insertion of the lamp mount is initiated, then the guide poles can be extremely easily inserted into the slide pipes since the slide pipes extend out of the lamp chamber when the insertion of the lamp mount is initiated. This provides an advantage that coupling of the guide poles and the guide pipes can be easily achieved, and in addition alignment of the rotary arm and the lamp mount is almost unnecessary when they are to be coupled.

What is claimed is:

1. A light source device for use in a medical apparatus, comprising:
   a movable flange movably mounted on a housing;
   an actuator for supporting at least two light sources thereon;
   coupling means for removably coupling said movable flange with said actuator and for transmitting to said movable flange the action applied to said actuator, said actuator being able to be manually coupled through said coupling means to said movable flange;
   light conductor means for guiding light from one of said light sources to an object to be illuminated;
   said actuator being provided with at least two connector plugs each of which is electrically connected to a corresponding one of said light sources;
   said movable flange being provided with connector sockets electrically connected to a power source with which each of said connector plugs is engaged when said actuator is coupled through said coupling means; and
   switch means for controlling the supply of power from said power source to each of said connector sockets to supply power to only a selected one of said light sources when said selected one of said light sources is positioned opposite to the inlet of said light conductor means by moving said actuator.

2. A light source device for use in a medical apparatus as claimed in claim 1, in which said switch means comprises:
   at least two mechanical switches corresponding to said connector sockets, said at least two mechanical switches being supported by said movable flange; and
   closing means disposed on said housing for closing only one of said mechanical switches which is electrically connected to one of said light sources when said one of said light sources is positioned opposite to said inlet of said light conductor means.

3. A light source device for use in a medical apparatus, comprising:
   a movable flange movably mounted on a housing;
   an actuator supporting at least two light sources thereon;
   coupling means for removably coupling said movable flange with said actuator and for transmitting to said movable flange the action applied to said actuator;
   light conductor means for guiding light from one of said light sources to an object to be illuminated;
   said actuator being provided with at least two connector plugs each of which is electrically connected to a corresponding one of said light sources;
   said movable flange being provided with connector sockets electrically connected to a power source with which each of said connector plugs is engaged when said actuator is coupled through said coupling means;
   switch means for controlling the supply of power from said power source to each of said connector socket to supply power to only a selected one of said light sources when said selected one of said light sources is positioned opposite to the inlet of said light conductor means by moving said actuator; and
   a safety stopper mechanism for turning off all said switches when said actuator is positioned in a predetermined position, for allowing said actuator to be removed from said movable flange only when said actuator is in said predetermined position, and for preventing said actuator from being removed from said movable flange when said actuator is in any position other than said predetermined position.

4. A light source apparatus for use in a medical apparatus as claimed in claim 3, in which said movable flange includes a rotary arm turnable about an axis of rotation of said housing and having a free end supporting a cylindrical lamp mount receptacle, said actuator having a disk-shaped lamp mount for holding said light sources thereon, said lamp mount being insertable into said lamp mount receptacle, said stopper mechanism comprising a stopper pin which is attached to said lamp mount and which is engageable with said lamp mount receptacle when said actuator is in any position other than said predetermined position and which is movable toward said axis of rotation, and a stopper pressure plate placed adjacent to said lamp mount receptacle for moving said stopper pin toward said axis of rotation when said actuator is in predetermined position.

5. A light source device for use in a medical apparatus, comprising:
   a movable flange movably mounted on a housing;
   an actuator supporting at least two light sources thereon;
   coupling means for removably coupling said movable flange with said actuator and for transmitting to said movable flange the action applied to said actuator;
   light conductor means for guiding light from one of said light sources to an object to be illuminated;
   said actuator being provided with at least two connector plugs each of which is electrically connected to a corresponding one of said light sources;
   said movable flange being provided with connector sockets electrically connected to a power source with which each of said connector plugs is engaged when said actuator is coupled through said coupling means;
   switch means for controlling the supply of power from said power source to each of said connector sockets to supply power to only a selected one of said light sources when said selected one of said light sources is positioned opposite to the inlet of said light conductor means by moving said actuator; and
   detent means for preventing at least said movable flange from moving when said actuator is incompletely coupled with said movable flange.

6. A light source device for use in a medical apparatus as claimed in claim 5, in which said movable flange includes a rotary arm turnable about an axis of rotation of said housing and having a free end supporting a cylindrical lamp mount receptacle, said actuator having a disk-shaped lamp mount for holding said light sources thereon and which is insertable into said lamp mount in a direction parallel to said axis of rotation, said detent means comprising a stopper groove provided at a predetermined portion of said housing adjacent to said lamp mount receptacle; a stopper pin provided on said lamp mount receptacle and movable in a direction parallel to said axis of rotation and engageable in said stopper groove by removing said lamp mount; and a spring for urging said stopper pin in a direction which is parallel to said axis of rotation and in which said lamp mount can be removed.

7. A light source device for use in a medical apparatus, comprising:
   a movable flange movably mounted on a housing;
   an actuator supporting at least two light sources thereon;
   coupling means for removably coupling said movable flange with said actuator and for transmitting to said movable flange the action applied to said actuator;
   light conductor means for guiding light from one of said light sources to an object to be illuminated;
   said actuator being provided with at least two connector plugs each of which is electrically connected to a corresponding one of said light sources;
   said movable flange being provided with connector sockets electrically connected to a power source with which each of said connector plugs is engaged when said actuator is coupled through said coupling means;
   switch means for controlling the supply of power from said power source to each of said connector sockets to supply power to only a selected one of said light sources when said selected one of said light sources is positioned opposite to the inlet of said light conductor means by moving said actuator;
   said housing having an opening for insertion of said actuator thereinto; and
   said coupling means comprising: a post member provided on said actuator and extending in a direction parallel to the director of insertion thereof; an engaging member provided on said movable flange in such a manner that said post member can be inserted into and engaged with said engaging member; a guide member provided on said engaging member and movable in a direction parallel to said direction of insertion and capable of being penetrated by said post; and moving means for moving said guide member in such a manner that the free end of said guide member projects out of said insertion opening when said actuator is separate from said movable flange.

8. A light source device for use in a medical apparatus as claimed in claim 7, wherein said post member comprises two cylindrical guide poles, said engaging member comprises two cylindrical guide pipes, said guide member comprises two slide pipes that are slidably fitted on respective ones of said guide pipes, and said moving means comprises two springs fitted over respective ones of said guide pipes.

* * * * *